United States Patent
Wang

(10) Patent No.: US 11,420,281 B2
(45) Date of Patent: Aug. 23, 2022

(54) ELECTRIC HEATING DEVICE

(71) Applicant: Pro-Iroda Industries, Inc., Taichung (TW)

(72) Inventor: Guan Jun Wang, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 713 days.

(21) Appl. No.: 16/427,575

(22) Filed: May 31, 2019

(65) Prior Publication Data

US 2020/0101547 A1    Apr. 2, 2020

(30) Foreign Application Priority Data

Sep. 27, 2018  (TW) ................. 107134130

(51) Int. Cl.
| | |
|---|---|
| *B23K 3/00* | (2006.01) |
| *B23K 3/03* | (2006.01) |
| *B23K 3/06* | (2006.01) |
| *B23K 3/02* | (2006.01) |

(52) U.S. Cl.
CPC ............ *B23K 3/0353* (2013.01); *B23K 3/025* (2013.01); *B23K 3/063* (2013.01)

(58) Field of Classification Search
CPC ...... B23K 3/0353; B23K 3/025; B23K 3/063; B23K 3/0315; B23K 3/00–3/053
USPC ............... 228/51–55; 219/221–242
See application file for complete search history.

(56) References Cited

U.S. PATENT DOCUMENTS

| | | | | |
|---|---|---|---|---|
| 2,667,561 A | * | 1/1954 | Schoenwald | B23K 3/0353 338/20 |
| 2,900,481 A | * | 8/1959 | Marcantonio | A61J 11/009 219/233 |
| 3,002,077 A | * | 9/1961 | Caliri | B23K 3/033 219/229 |
| 3,536,890 A | * | 10/1970 | Hombrecher | B23K 3/0338 219/229 |
| 4,328,920 A | * | 5/1982 | Vella | B23K 1/018 219/230 |
| 4,773,582 A | * | 9/1988 | Vella | H05K 13/0486 219/230 |
| 5,073,696 A | * | 12/1991 | Patillo | A61C 13/0028 219/229 |
| 5,117,091 A | * | 5/1992 | Ely | B23K 3/0338 219/229 |
| 6,054,678 A | * | 4/2000 | Miyazaki | H05B 3/46 219/229 |

(Continued)

*Primary Examiner* — Kiley S Stoner
(74) *Attorney, Agent, or Firm* — Alan D. Kamrath; Karin L. Williams; Mayer & Williams PC

(57) ABSTRACT

An electric heating device includes a body and a heating head connected to the body. The heating head includes an electric heating wire and a heat storage member. The electric heating wire includes a first section and a second section connected to the first section. The first section is made of pure nickel. The second section is made of ferrochrome. The heat storage member is mounted around an outer radial periphery of the second section. The heat storage member is made of porcelain clay. The electric heating wire is connected by sections of three different materials so that the heating head can be raised to a very high temperature with extremely high heat generation efficiency, and the electric heating device is not easily damaged by high temperature.

10 Claims, 4 Drawing Sheets

(56) References Cited

U.S. PATENT DOCUMENTS

| | | | | |
|---|---|---|---|---|
| 6,087,631 A | * | 7/2000 | Miyazaki | G01K 7/08 |
| | | | | 219/229 |
| 2006/0108345 A1 | * | 5/2006 | Shigekawa | B23K 3/0369 |
| | | | | 219/229 |
| 2015/0271927 A1 | * | 9/2015 | Cocklin | B23K 3/02 |
| | | | | 228/8 |
| 2019/0299311 A1 | * | 10/2019 | Mochizuki | B23K 3/033 |
| 2020/0030902 A1 | * | 1/2020 | Matsuzaki | B23K 3/033 |

* cited by examiner

ELECTRIC HEATING DEVICE

BACKGROUND

The present invention relates to heating implements and in particular electric heating devices.

A typical soldering iron is composed of a heated metal tip and an insulated handle. Heating is often achieved electrically, by passing an electric current through a resistive heating element via a metal wire, such as copper wire. Because the melting point of the copper wire is low, the metal wire is easily broken and damaged due to the thermal influence of the high temperature of the heated metal tip.

Thus, a need exists for a novel electric heating device to mitigate and/or obviate the above disadvantages.

SUMMARY

A electric heating device according to the present invention includes a body and a heating head connected to the body. The heating head includes an electric heating wire and a heat storage member. The electric heating wire includes a first section and a second section having a proximal end connected to the first section. The first section is made of pure nickel, and the second section is made of ferrochrome. The heat storage member is mounted around an outer radial periphery of the second section, and the heat storage member is made of porcelain clay.

In an example, the second section is fixedly welded to the first section.

In an example, the heating head includes an outer sleeve made of electrically conductive material and mounted around the heat storage member. A distal end of the second section opposite to the proximal end is connected to the outer sleeve.

In an example, the distal end of the second section is provided with a flat section extended radially outward from the second section. A terminal edge of the flat section is connected to an end face of the outer sleeve.

In an example, the flat section is spot welded to the end face of the outer sleeve.

In an example, the flat section has a circular cross-section.

In an example, one end of the body is provided with a head end having a recess. A bottom face of the recess is provided with a first electrode, and an inner wall extended around the bottom face of the recess is provided with a second electrode. The heating head includes a power connector detachably connected to the body. The power connector is provided with a third electrode electrically coupled to the first electrode, and a fourth electrode electrically coupled to the second electrode.

In an example, the heating head includes a connecting seat mounted to one end of the power connector. The connecting seat is provided with a through hole penetrating therethrough, and the through hole is mounted around a portion of an outer radial periphery of the outer sleeve.

In an example, the fourth electrode is threaded coupled to the second electrode.

In an example, the first section is electrically coupled to the third electrode. One end of the outer sleeve opposite to the flat section is connected to a connecting member made of electrically conductive material. One end of the connecting member is electrically coupled to fourth electrode, and the connecting member is formed in a spiral shape by coiling.

The present invention will become clearer in light of the following detailed description of illustrative embodiments of this invention described in connection with the drawings.

BRIEF DESCRIPTION OF THE DRAWINGS

The aforementioned and other aspects of the invention may best be understood by reference to the following description taken in conjunction with the accompanying drawings in which:

FIG. 3 is a cross-sectional views of the electric heating device of

DETAILED DESCRIPTION

Figure 1:
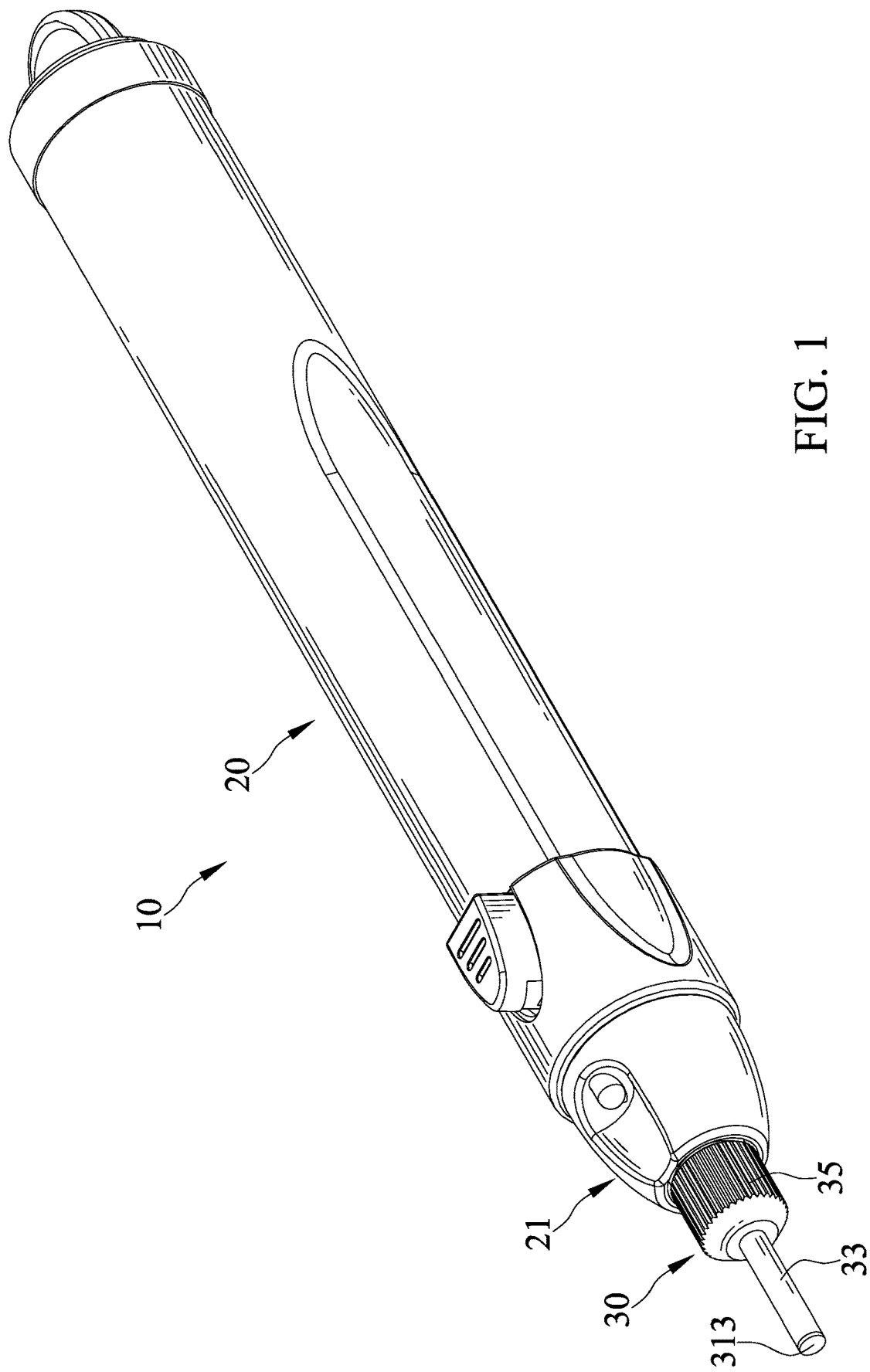
FIG. 1 is a perspective view of an electric heating device according to the present invention.
Figure 2:
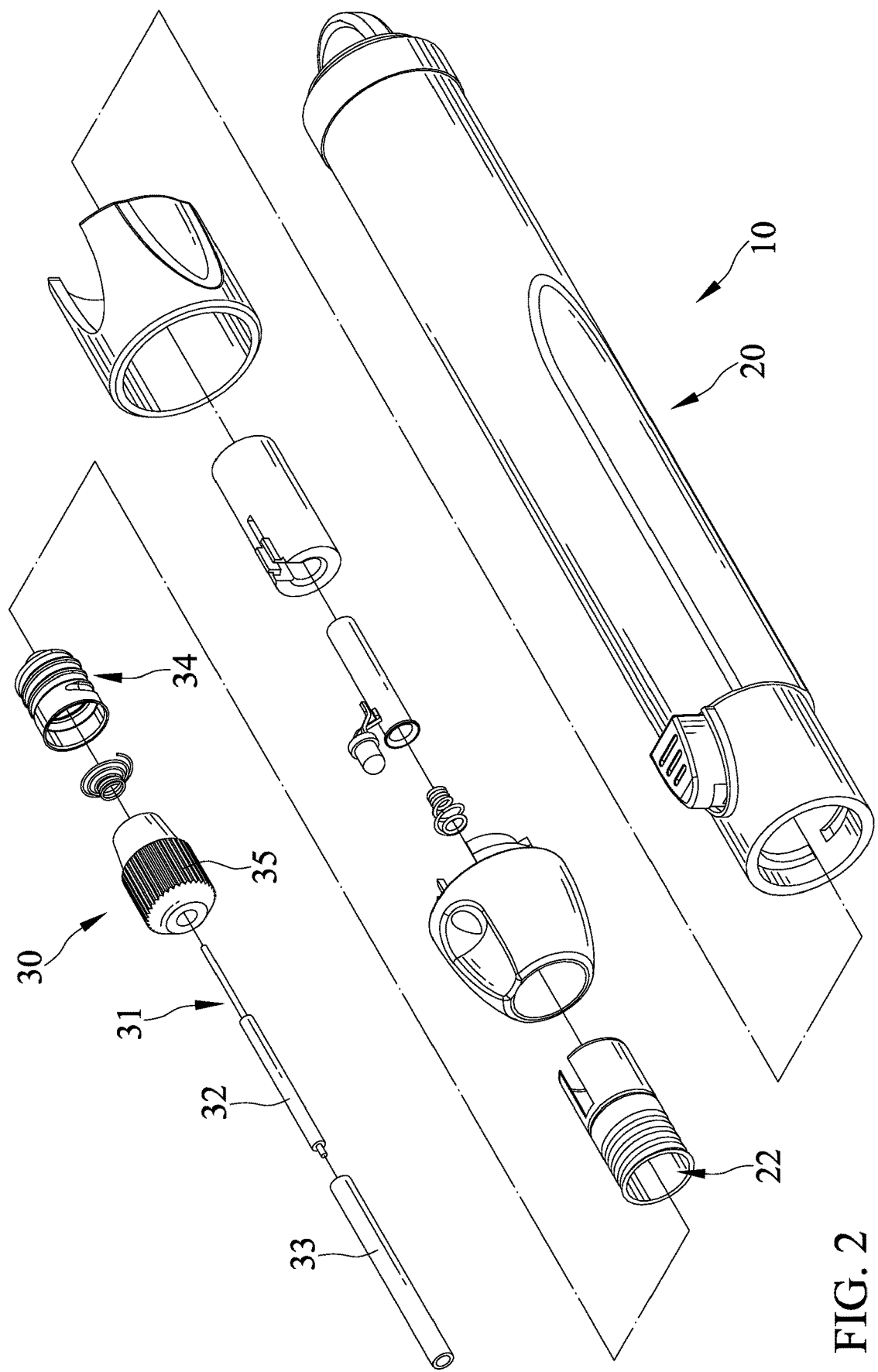
FIG. 2 is an exploded, perspective view of the electric heating device of FIG. 1.
Figure 3:
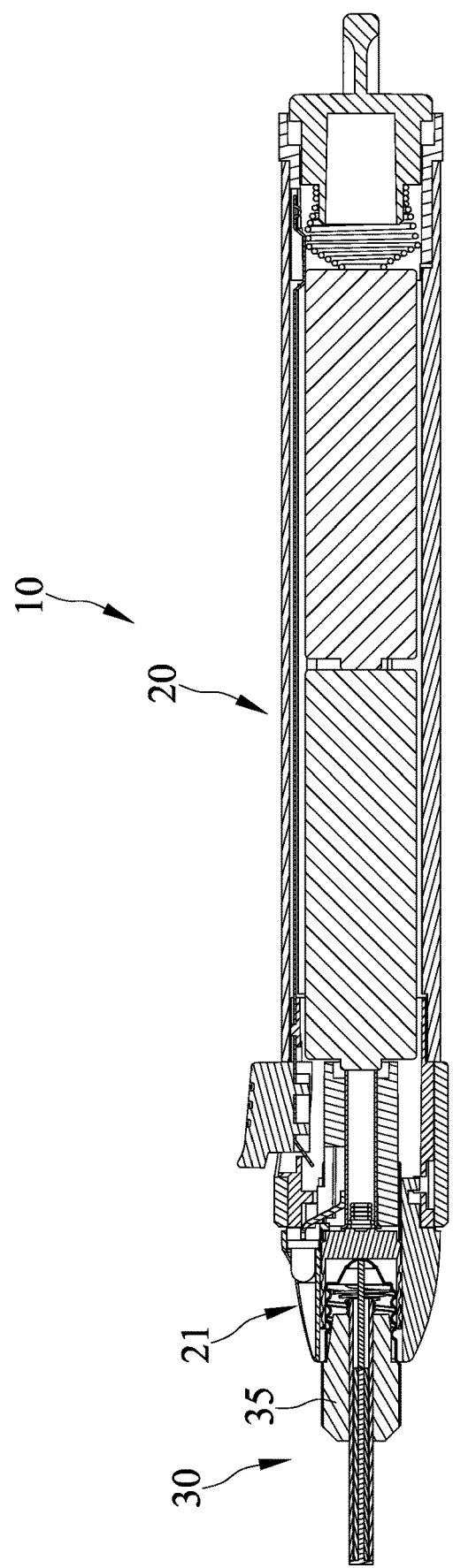
Figure 4:
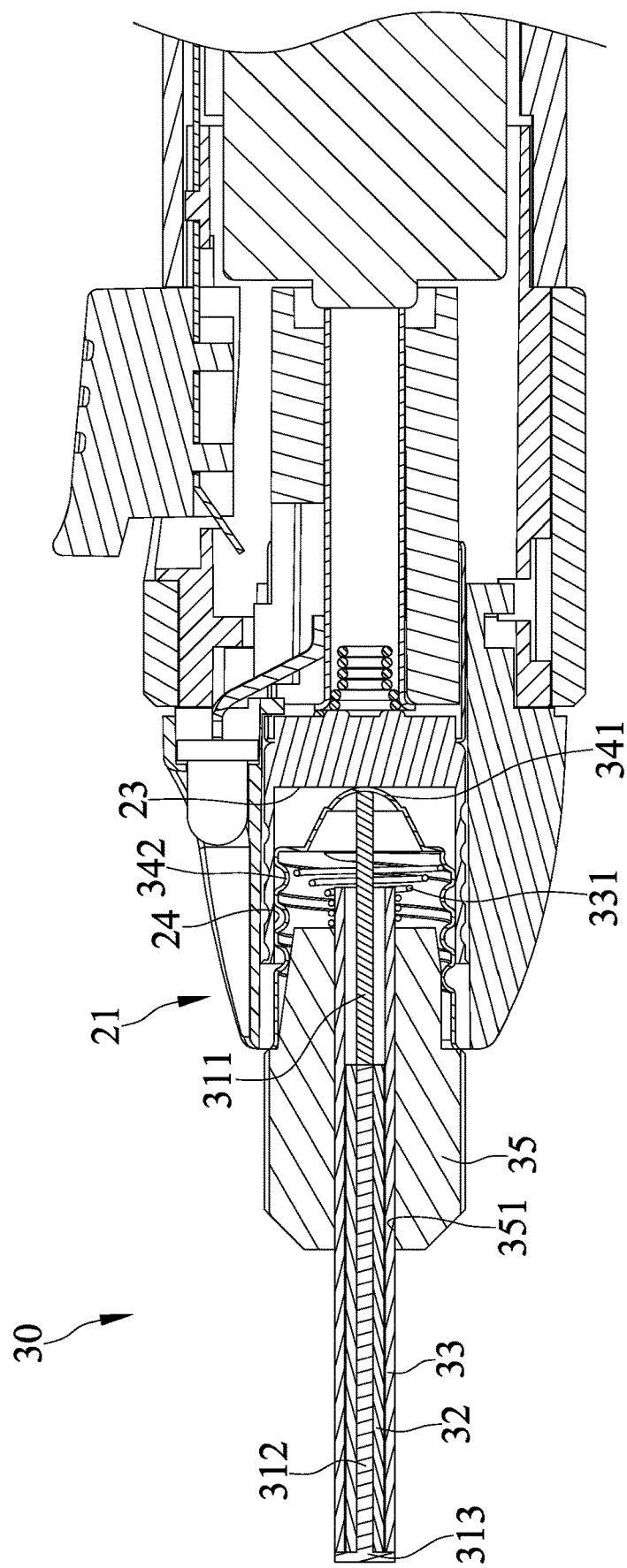
FIG. 4 is an exploded, partial cross-sectional views of a heating head of the electric heating device of FIG. 1.

FIGS. 1-4 show an electric heating device 10 according to the present invention. The electric heating device 10 includes a body 20 and a heating head 30 connected to the body 20. One end of the body 20 is provided with a head end 21 having a recess 22. A bottom face of the recess 22 is provided with a first electrode 23, and an inner wall extended around the bottom face of the recess 22 is provided with a second electrode 24.

The heating head 30 includes an electric heating wire 31, a heat storage member 32, and an outer sleeve 33. The electric heating wire 31 includes a first section 311 and a second section 312 having a proximal end connected to the first section 311. In the embodiment, the second section 312 may be fixedly welded to the first section 311. The first section 311 is made of pure nickel, and the second section 312 is made of ferrochrome. The heat storage member 32 is mounted around an outer radial periphery of the second section 312, and the heat storage member 32 is made of porcelain clay. The outer sleeve 33 is made of electrically conductive material and is mounted around the heat storage member 32. A distal end of the second section 312 opposite to the proximal end is connected to the outer sleeve 33. The distal end of the second section 312 is provided with a flat section 313 extended radially outward from the second section 312, and a terminal edge of the flat section 313 is connected to an end face of the outer sleeve 33. In the embodiment, the flat section 313 may have a circular cross-section, and the flat section 313 may be spot welded to the end face of the outer sleeve 33.

The heating head 30 further includes a power connector 34 detachably connected to the body 20, and a connecting seat 35 mounted to one end of the power connector 34. The power connector 34 is provided with a third electrode 341 electrically coupled to the first electrode 23, and a fourth electrode 342 electrically coupled to the second electrode 24. The fourth electrode 342 may be threaded coupled to the second electrode 24. The first section 311 is electrically coupled to the third electrode 341. One end of the outer sleeve 33 opposite to the flat section 313 is connected to a connecting member 331 made of electrically conductive material. One end of the connecting member 331 is electrically coupled to fourth electrode 342, and the connecting member 331 is formed in a spiral shape by coiling. The connecting seat 35 is provided with a through hole 351 penetrating therethrough, and the through hole 351 is mounted around a portion of an outer radial periphery of the outer sleeve 33.

Therefore, the electric heating wire 31 is connected by sections of three different materials, namely pure nickel, ferrochrome, and porcelain clay. When the heating head 30 is energized, the resistance of the first section 311 is small so that no excess heat energy is generated. When the current flows through the second section 312, it can be converted into heat energy to raise the temperature. The second section 312 is covered by the heat storage member 32 made of porcelain clay, so that the heating head 30 can be raised to a very high temperature without damage, and has extremely high heat generation efficiency. Further, the first section 311 made of pure nickel with good heat resistance so that the first section 311 is not easily melted by the high temperature generated by the second section 312. Thus, the electric heating device 10 is not easily damaged by high temperature.

While various embodiments have been described above, it should be understood that they have been presented by way of example only, and not limitation. For example, any of the elements associated with the privacy summary may employ any of the desired functionality set forth hereinabove. Thus, the breadth and scope of a preferred embodiment should not be limited by any of the above-described exemplary embodiments.

What is claimed is:

1. A electric heating device comprising:
   a body; and
   a heating head connected to the body and including an electric heating wire and a heat storage member, with the electric heating wire including a first section and a second section having a proximal end connected to the first section, with the first section being made of pure nickel, with the second section being made of ferrochrome, with the heat storage member mounted around an outer radial periphery of the second section, and with the heat storage member being made of porcelain clay.

2. The electric heating device as claimed in claim 1, wherein the second section is fixedly welded to the first section.

3. The electric heating device as claimed in claim 2, wherein the heating head includes an outer sleeve made of electrically conductive material and mounted around the heat storage member, and wherein a distal end of the second section opposite to the proximal end is connected to the outer sleeve.

4. The electric heating device as claimed in claim 3, wherein the distal end of the second section is provided with a flat section extended radially outward from the second section, and wherein a terminal edge of the flat section is connected to an end face of the outer sleeve.

5. The electric heating device as claimed in claim 4, wherein the flat section is spot welded to the end face of the outer sleeve.

6. The electric heating device as claimed in claim 4, wherein the flat section has a circular cross-section.

7. The electric heating device as claimed in claim 4, wherein one end of the body is provided with a head end having a recess, wherein a bottom face of the recess is provided with a first electrode, wherein an inner wall extended around the bottom face of the recess is provided with a second electrode, wherein the heating head includes a power connector detachably connected to the body, and wherein the power connector is provided with a third electrode electrically coupled to the first electrode, and a fourth electrode electrically coupled to the second electrode.

8. The electric heating device as claimed in claim 7, wherein the heating head includes a connecting seat mounted to one end of the power connector, wherein the connecting seat is provided with a through hole penetrating therethrough, and wherein the through hole is mounted around a portion of an outer radial periphery of the outer sleeve.

9. The electric heating device as claimed in claim 7, wherein the fourth electrode is threaded coupled to the second electrode.

10. The electric heating device as claimed in claim 7, wherein the first section is electrically coupled to the third electrode, wherein one end of the outer sleeve opposite to the flat section is connected to a connecting member made of electrically conductive material, wherein one end of the connecting member is electrically coupled to fourth electrode, and wherein the connecting member is formed in a spiral shape by coiling.

\* \* \* \* \*